United States Patent
Tuikka

(10) Patent No.: US 8,644,760 B2
(45) Date of Patent: Feb. 4, 2014

(54) ARRANGEMENT FOR AN NFC COMPATIBLE MOBILE DEVICE FOR DELAYED TRANSFER OF AN ESTABLISHED FRIEND CONNECTION AND A RELATED METHOD

(75) Inventor: Tuomo Tuikka, Oulu (FI)

(73) Assignee: SoLoCEM Systems Oy, Kempele (FI)

( * ) Notice: Subject to any disclaimer, the term of this patent is extended or adjusted under 35 U.S.C. 154(b) by 193 days.

(21) Appl. No.: 13/260,628

(22) PCT Filed: Apr. 9, 2010

(86) PCT No.: PCT/FI2010/050287
§ 371 (c)(1),
(2), (4) Date: Sep. 27, 2011

(87) PCT Pub. No.: WO2010/116043
PCT Pub. Date: Oct. 14, 2010

(65) Prior Publication Data
US 2012/0028578 A1    Feb. 2, 2012

(30) Foreign Application Priority Data

Apr. 9, 2009 (FI) ...................................... 20095397

(51) Int. Cl.
*H04B 5/00* (2006.01)
(52) U.S. Cl.
USPC ... 455/41.1; 455/41.2; 455/432.1; 455/435.1; 455/103; 455/552.1; 709/227; 726/93; 370/302; 370/338; 340/5.61
(58) Field of Classification Search
USPC ................. 455/41.1, 41.2, 432.1, 103, 552.1, 455/435.1; 709/227; 235/451, 492; 726/93; 370/302, 338; 340/5.61
See application file for complete search history.

(56) References Cited

U.S. PATENT DOCUMENTS

| | | | |
|---|---|---|---|
| 7,590,384 B2 * | 9/2009 | Dawidowsky | 455/41.1 |
| 7,647,024 B2 * | 1/2010 | Wang et al. | 455/41.2 |
| 7,882,244 B2 * | 2/2011 | Helvick | 709/227 |
| 7,948,925 B2 * | 5/2011 | Miyabayashi et al. | 370/302 |
| 7,957,733 B2 * | 6/2011 | Wang et al. | 455/426.2 |
| 8,032,182 B2 * | 10/2011 | Bennett | 455/558 |
| 8,041,346 B2 * | 10/2011 | Tyhurst et al. | 709/219 |

(Continued)

FOREIGN PATENT DOCUMENTS

| | | |
|---|---|---|
| GB | 2 449 510 A | 11/2008 |
| KR | 20020009729 A | 2/2002 |

(Continued)

OTHER PUBLICATIONS

Finnish Search Report, dated Feb. 24, 2010, from corresponding Finnish application.

(Continued)

*Primary Examiner* — Marceau Milord
(74) *Attorney, Agent, or Firm* — Young & Thompson

(57) ABSTRACT

An arrangement for an NFC compatible mobile device for delayed transfer of an established friend connection and a related method. The arrangement is suitable, for example, for delaying the transmission of information about a friend connection established over the NFC relative to another NFC compatible device to a remote device, such as a server, in that case the network connection is not available or does not fulfill a predetermined criterion.

18 Claims, 2 Drawing Sheets

(56) References Cited

U.S. PATENT DOCUMENTS

| | | | |
|---|---|---|---|
| 8,102,797 B2* | 1/2012 | Abel | 370/328 |
| 8,116,679 B2* | 2/2012 | Dunko | 455/41.1 |
| 8,233,841 B2* | 7/2012 | Griffin et al. | 455/41.1 |
| 8,240,568 B2* | 8/2012 | Matsuo | 235/451 |
| 8,244,917 B2* | 8/2012 | Takayama et al. | 710/1 |
| 8,285,211 B2* | 10/2012 | Wang et al. | 455/41.2 |
| 8,365,268 B2* | 1/2013 | Ejima | 726/9 |
| 2005/0114526 A1 | 5/2005 | Aoyama | |
| 2005/0148331 A1* | 7/2005 | Sharon et al. | 455/435.1 |
| 2006/0183462 A1* | 8/2006 | Kolehmainen | 455/411 |
| 2007/0275696 A1 | 11/2007 | Cheng et al. | |
| 2009/0157799 A1* | 6/2009 | Sukumaran et al. | 709/203 |
| 2009/0222659 A1* | 9/2009 | Miyabayashi et al. | 713/156 |

FOREIGN PATENT DOCUMENTS

| | | |
|---|---|---|
| WO | 2004/057888 A1 | 7/2004 |
| WO | 2008/142455 A2 | 11/2008 |
| WO | 2009121027 A2 | 10/2009 |

OTHER PUBLICATIONS

International Search Report, dated Jul. 9, 2010, from corresponding PCT application.

* cited by examiner

ARRANGEMENT FOR AN NFC COMPATIBLE MOBILE DEVICE FOR DELAYED TRANSFER OF AN ESTABLISHED FRIEND CONNECTION AND A RELATED METHOD

FIELD OF THE INVENTION

Generally the invention relates to short-range communication such as near field communication (NFC). In particular, the invention concerns establishment of a friend connection by using the NFC technology.

BACKGROUND OF THE INVENTION

Communication falling under NFC typically refers to short-range wireless, i.e. contactless, communication following the corresponding standard(s) aimed for simple and safe communication between electronic devices. NFC communication is enabled by bringing two NFC compatible devices within a short distance, e.g. few centimeters, of one another. Contemporary applications of NFC technology are associated with different financial transactions, such as various payment and ticketing services, and simple data access, e.g. data retrieval, solutions. NFC capability may be added to a mobile terminal, a PDA (personal digital assistant), or some other portable or even hand-held device, which can be, and often is, carried along anyway. Technology-wise NFC is typically based on inductive-coupling, which reminds of the technology behind RFID (RF identification) tags and transponders. NFC technology is specified in a plurality of standards relative to the applicable hardware components and used data transfer methods. Standards are created, maintained and/or adopted by entities including, but not limiting to, ISO/IEC (International Organization for Standardization/International Electrotechnical Commission), ETSI (European Telecommunications Standards Institute), ECMA (European association for standardizing information and communication systems), GSMA (GSM Association), The Wireless USB Promoter Group and Wi-Fi Alliance. Large conglomerates such as Philips and Sony (e.g. FeliCa) have been active in developing NFC compatible devices.

Social media applications such as Facebook, MySpace and LinkedIn have gained tremendous popularity among the Internet users since the beginning of the 2000's. The concept of establishing various online communities through creation of an up-to-date on-line user profile by a desktop or portable computing device in a preferred social networking service and subsequently inviting a number of friends or business contacts to join the service for future information sharing seems to be the most typical implementation approach depending on the focus of the service (either business-oriented or a more like a buddy list). The users belonging to the same sub-community, i.e. 'friends' or 'contacts', may often contribute to others' profiles and share thoughts, files, links, and applications via the service whereas the remaining users being not members of the same sub-community may only access limited information related thereto. The social networking solutions thus try to combine features from more traditional paper-form or electronic personal address book, calendar, blogs, and web pages into an aggregate (social) life portal for also others to use.

NFC-technique may be used to establish a friend connection by bringing two NFC compatible devices within a short distance of one other for information exchange. Then, the collected information may be utilized in social media applications, such as Facebook. However, creating a new friend connection may require an available network connection via which related information is transferred from an NFC compatible device to a remote server, for example. If the network connection is too slow, erroneous, or totally absent, establishing the friend connection remotely will fail. In the worst case, establishing a friend connection begins properly between the two NFC compatible devices, but while transferring the related information forward the network connection is lost and the whole procedure fails. Unfortunately, the user might not notice that and he/she may lose valuable contact information.

SUMMARY OF THE INVENTION

The objective is to improve social contacts network formation and management overcoming at least some of the drawbacks evident in the prior art arrangements.

The objective is met by an arrangement for an NFC compatible mobile device in accordance with the present invention. For example, a mobile application included in the mobile device may be configured to monitor and notice, when the network connection is too slow or missing, and to store information about a friend connection in a memory for delayed transfer to a remote device such as a server.

Accordingly, in one aspect an arrangement for an NFC compatible mobile device comprises a monitoring means configured to monitor the status of a network connection and a storage means for storing information about a friend connection established through data exchange over the NFC with another NFC compatible device, wherein the arrangement further comprises a controlling logic configured to store in the storage means information about the established friend connection, to obtain information related to the network connection status from the monitoring means and to assess the applicability of the network connection, and, if the network connection is not available or does not fulfill a predetermined criterion, to delay the transmission of the information about the established friend connection to a remote device until the network is usable again.

In another aspect, a method for registering a friend connection in a remote device, such as a server, to be performed by an NFC compatible device, comprises:
  obtaining information about a friend connection established over the NFC relative to another NFC compatible device,
  storing the information about the established friend connection,
  obtaining information related to the status of a network connection,
  assessing the availability or applicability of the network connection on the basis of the information related to the status thereof,
  delaying transmitting the information about the established friend connection to the remote device via the network until the network becomes usable.

The utility of the present invention arises from plurality of issues. The invention provides possibility to save time by enabling the user to store the information about the friend connection in the memory while the network is not available or provides only insufficient data transfer capability. By such feature, the user may avoid retrying to remotely register the friend connection in the remote device; instead the application ensures the creation of the friend connection.

In this patent application the expression "information about a friend connection" may refer to any kind of contact information, e.g. device-specific and/or user-specific information such as corresponding IDs, exchanged between NFC compatible devices.

Various embodiments of the present invention are disclosed in the dependent claims.

BRIEF DESCRIPTION OF THE DRAWINGS

Next the invention will be described in more detail with reference to the following drawings.

DETAILED DESCRIPTION OF THE EMBODIMENTS

Figure 1:
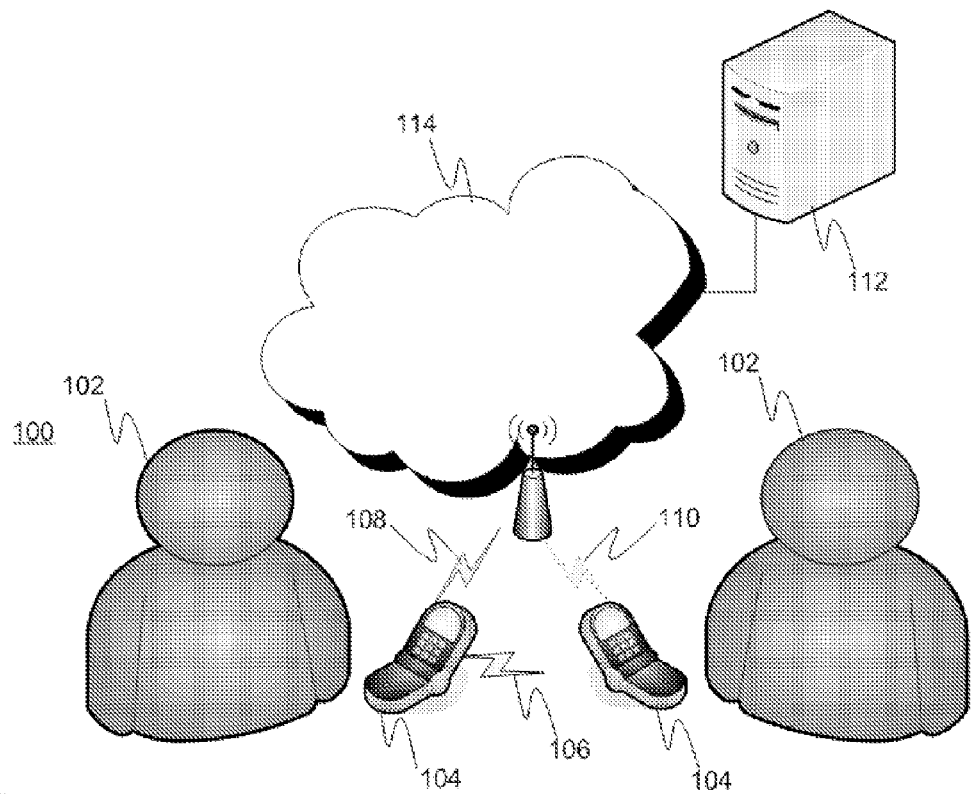
FIG. 1 illustrates one use scenario of the present invention.

FIG. 1 illustrates one use scenario of the present invention. The users 102 of NFC compatible mobile devices have brought their mobile devices 104 near to each other so that the establishment 106 of the friend connection may begin. Information about the established friend connection is meant to transfer 108, 110 to a remote device 112 via the communication network 114.

A merely exemplary way of technically registering a new social contact via mating the associated mobile communications devices through short-range wireless communication is now explained. Both the users 102 have a mobile device 104 of their own provided with necessary software for implementing a social contact registration logic. The users 102 have activated a feature allowing the establishment of new contacts via the supported short-range wireless technology such as the NFC. The users 102 physically meet each other, whereupon both of them are willing to add the other party as a new social contact. The mobile devices 104 are set next to each other and the social contact registration logics in both devices mutually exchange relevant information. Consequently, mobile viral social networks associated with the users 102 (and mobile devices 104) are expanded. From a technical standpoint one device may act as a master and the other as a slave during the communication, for example. The exchanged information may be delimited to the personal information and/or mobile device information of the users 102 themselves, or data on already-existing other social contacts may be optionally transferred to a predetermined extent (e.g. mere names, aliases or other ID's) as well.

Mobile devices 102 may forward the obtained information by means of a social contact notification logic to remote entities 112 such as a service management server. In the example of FIG. 1 the network connection for the transferring 110 is too slow and/or malfunctioning or totally missing, so the created friend connection is stored in the memory and the network connection status is further monitored by the application either continuously or in a timed manner, for instance. When the network connection becomes available and applicable again, information about the established friend connection is transferred to the remote entity 112.

Figure 2:
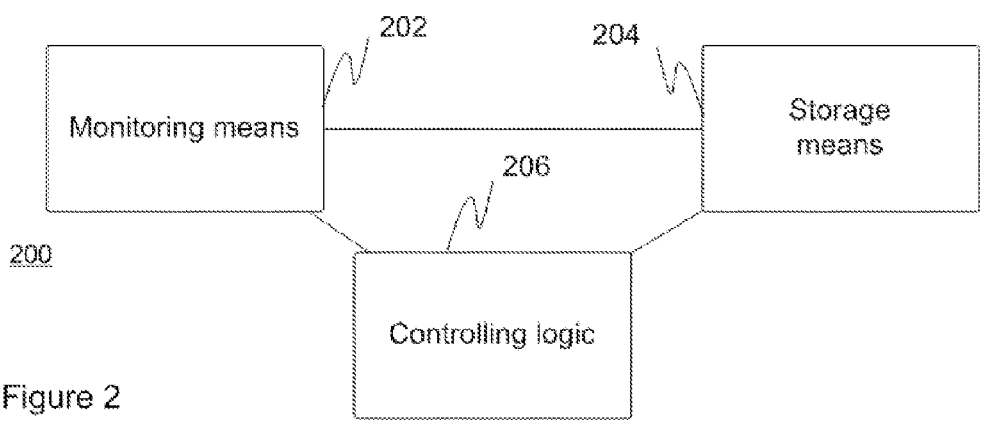
FIG. 2 shows a block diagram of the arrangement for an NFC compatible mobile device in accordance with the present invention.

In FIG. 2 is shown a block diagram of the arrangement for NFC compatible mobile device in accordance with the present invention. The arrangement comprises a monitoring means 202, a storage means 204 and a controlling logic 206.

Monitoring means 202 may include, for example, a monitoring logic block. Monitoring means 202 is configured to monitor the status of the network connection, i.e. availability or accessibility of the network connection. The monitoring may be performed regularly, for instance once in a minute or once in ten minutes, or the monitoring may be performed only before a transfer attempt. The latter way is preferred, because it saves the battery. In that case an established friend connection is stored in the memory, the monitoring means 202 is configured to monitor the network connection status more often, for example once in every 1-3 second, until the network connection is available again. The monitoring may also be performed so that the controlling logic sends instruction/instructions to the monitoring means while requiring information of status of the network connection. The monitoring means may store the status data to the storage means or it may send the data direct to the controlling logic 206.

Storage means 204 is arranged for storing status data relative to the network connection monitored by the monitoring means and/or information about one or more established friend connections to be transferred to a remote entity. Storage means 204 may be divided between one or more physical memory chips or other memory elements, and it may comprise code, e.g. in a form of a computer program/application for the controlling logic 206, and other data. The storage means 204 does not have to necessarily be a dedicated memory, as it may be formed in the overall memory of the mobile device. However, the controlling logic has to have an access to the memory. Moreover, the storage means 204 may further include other storage media, such as a preferably detachable memory card or a fixed storage medium such as hard drive. The storage means 204 may be non-volatile, e.g. ROM, PROM, EEPROM or flash memory, and/or volatile, e.g. RAM, by nature.

Controlling logic 206 is configured to store in the storage means 204 the information about the established friend connection(s), to obtain the information related to the network connection status from the monitoring means 202, to assess availability of the network connection and, if the network connection is not available, to delay the transfer of the established friend connection until the network is available again.

Figure 3:
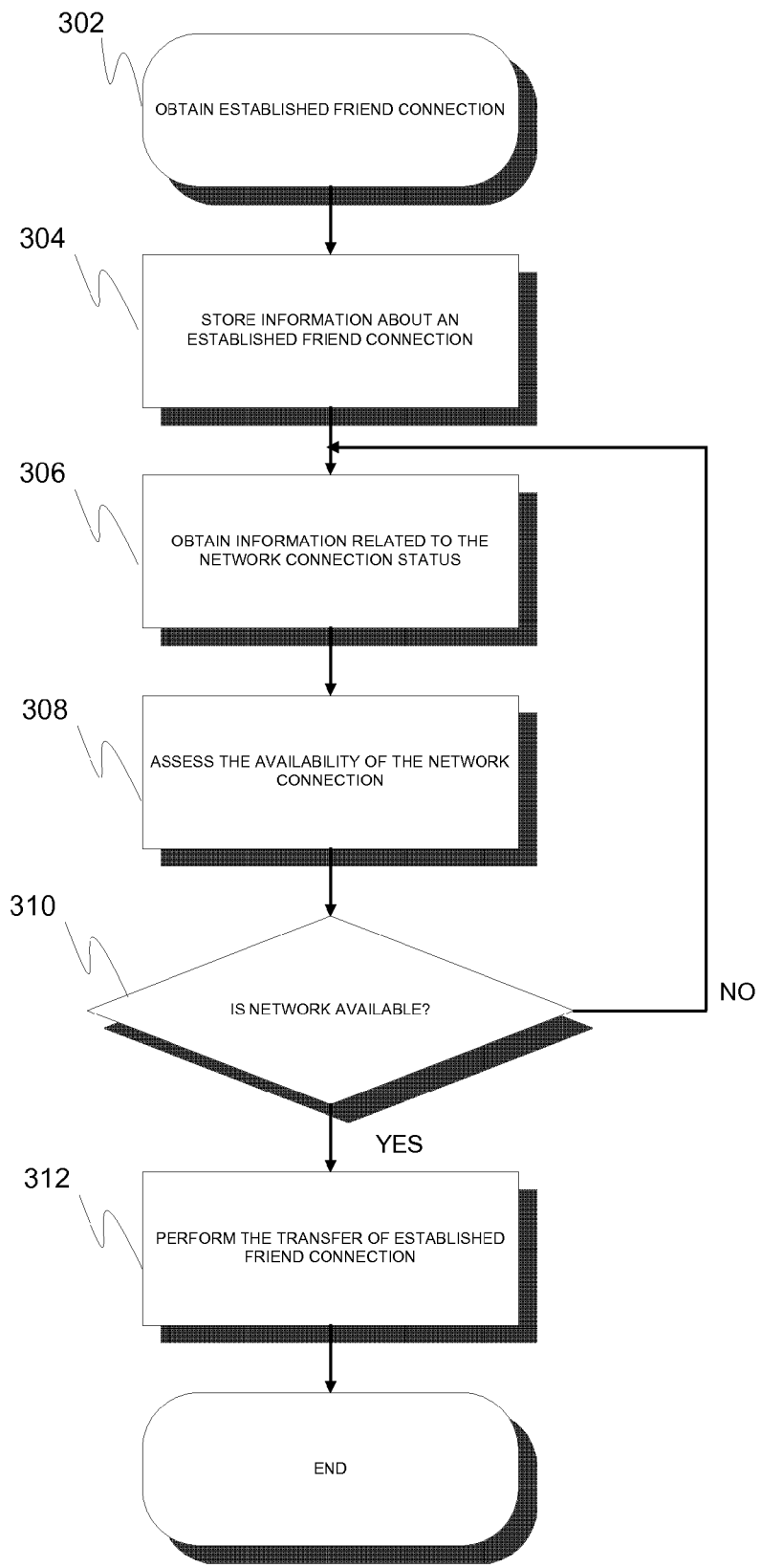
FIG. 3 is a flow diagram of an embodiment of a method according to the present invention.

In FIG. 3 is a flow diagram of an embodiment of a method according to the present invention. In the beginning, at 302 the controlling logic obtains information about the established friend connection. The friend connection is created by preferably utilizing the NFC-technology in the NFC compatible devices, or some other short-range wireless technology in other mobile devices. At phase 304, the information about the established friend connection is stored in the storage means. At phase 306, the controlling logic obtains the information about the status of the network connection from the monitoring unit. In one embodiment, the controlling logic may, at first, send an instruction/instructions to the monitoring means to monitor the status of the network connection, which may take place especially in that case the monitoring means is not configured to monitor the status of the network connection regularly or the monitoring is performed rarely. Instead, in another embodiment, wherein the monitoring means monitors the status of the network connection regularly and frequently, the controlling logic obtains the latest information of the network connection status from the monitoring means by requesting it, or the status may be sent to the controlling logic by the monitoring means. Then, at 308, the controlling logic assesses the availability of the network connection on the basis of the information about the network connection status obtained from the monitoring unit. If the network connection is available and applicable 310, i.e. the connection is accessible and e.g. fast enough, transfer of the information about the established friend connection is performed 312.

On the other hand, if the network connection absents or is too slow for transferring the information about the established friend connection, the transfer will be delayed (notice "NO" path in the figure). According to one embodiment, the controlling logic may confirm delaying the transfer from the user, e.g. via a prompt shown on the visual UI of the device, who then has possibility to accept the delayed transfer or, for example, discard the transfer completely. In some other embodiments delaying may be performed routinely or the user might have preset the option to delay the transfer. While the transfer is delayed, the controlling logic continues to obtain the information about the status of the network connection either by requesting the monitoring means to monitor the status of the network or by obtaining the latest information from the monitoring means continuously, and to assess the status of the network connection, at phases 306, 308 and 310 until the network connection is available again.

In a preferred embodiment the arrangement may provide a possibility to a user to classify, on the basis of predetermined categories, the type of the established friend connection. The type of the friend connection might be, for example, "friend" or "business associate" or "relative" to name a few. This feature can associate with the feature of delayed transfer, or it can be used independently. The categories can be determined by the user, or the categories can be predetermined, for example, by applying the categories of the common social media application.

The selected friend connection type may be transferred to a remote entity such as a server of the used social media application with the other friend connection-related information. Subsequently the social media application may exploit type data for classifying the friend connections or for other purposes.

The invention claimed is:

1. An arrangement for an NFC compatible mobile device associated with a first user, the arrangement comprising:
   a social contact registration logic for registering friend connections with other users at the NFC compatible mobile device,
   a monitoring means configured to monitor the status of a network connection,
   a storage means for storing information about a friend connection established between the first user and other user through data exchange over the NFC with another NFC compatible mobile device associated with the other user, and
   a controlling logic configured to store in the storage means information about the established friend connection, to obtain information related to the network connection status from the monitoring means and to assess the applicability of the network connection, and, when the network connection is not available or does not fulfill a predetermined criterion, to delay the transmission of the information about the established friend connection to a remote device until the network is usable again.

2. An arrangement of claim 1, wherein the controlling logic is configured to submit delayed transfer of the established friend connection to a user of the NFC compatible mobile device.

3. An arrangement of claim 2 wherein the controlling logic is configured to provide a user with a possibility to classify the established friend connection into a category.

4. An arrangement of claim 1, wherein the controlling logic is configured to provide a user with a possibility to classify the established friend connection into a category.

5. An arrangement of claim 4, wherein said categories are determined by the user.

6. An arrangement of claim 4, wherein said categories are predetermined.

7. A method for registering a friend connection in a remote device to be performed by an NFC compatible device associated with a first user, the method comprising:
   performing NFC information transfer with another NFC compatible device associated with other user,
   obtaining information about a friend connection established between the first user and the other user over the NFC,
   storing the information about the established friend connection,
   obtaining information related to the status of a network connection,
   assessing the availability or applicability of the network connection on the basis of the information related to the status thereof,
   delaying transmitting the information about the established friend connection to the remote device via the network until the network becomes usable.

8. The method of claim 7, wherein the remote device is a server.

9. An arrangement for registering a friend connection between two NFC compatible mobile devices associated with a first user and a second user, the arrangement comprising:
   a first NFC compatible mobile devices over associated with a first user and a second user;
   a second NFC compatible mobile devices over associated with a second user;
   a social contact registration logic that registers friend connections with other users at the first NFC compatible mobile device,
   a monitoring unit that monitors a status of a network connection,
   a storage unit that stores information about a friend connection established over NFC between the first user and the second user through data exchange over the NFC with the second NFC compatible mobile device associated with the second user, and
   a controlling logic that i) stores, in the storage unit, information about the established friend connection, ii) obtains information related to the network connection status from the monitoring unit, iii) assesses applicability of the network connection, and, iv) when the network connection is assessed not to be available or not to fulfill a predetermined criterion, delays the transmission of the information about the established friend connection to a remote device until the network is usable again.

10. An arrangement of claim 9, wherein the controlling logic submits delayed transfer of the established friend connection to the first user of the first NFC compatible mobile device.

11. An arrangement of claim 10, wherein the controlling logic provides the first user with an opportunity to classify the established friend connection into a category.

12. An arrangement of claim 11, wherein said category is defined by the user.

13. An arrangement of claim 11, wherein said category is one of plural predetermined categories.

14. An arrangement of claim 11, wherein said category is one of plural predetermined categories including a friend category, a business associate category and a relative category.

15. An arrangement of claim 9, wherein the remote device is a server.

16. An arrangement of claim 9, wherein the controlling logic, when the network connection is assessed not to be available, delays the transmission of the information about the established friend connection to a remote device until the network is usable again.

17. An arrangement of claim 9, wherein the controlling logic, when the network connection is assessed not to fulfill a predetermined criterion, delays the transmission of the information about the established friend connection to a remote device until the network is usable again.

18. An arrangement of claim 9, wherein the predetermined criterion is network connection speed between the first NFC compatible mobile device and a remote server.

* * * * *

UNITED STATES PATENT AND TRADEMARK OFFICE
CERTIFICATE OF CORRECTION

PATENT NO. : 8,644,760 B2
APPLICATION NO. : 13/260628
DATED : February 4, 2014
INVENTOR(S) : Tuomo Tuikka It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 191 days.

Signed and Sealed this
Twenty-ninth Day of September, 2015

Michelle K. Lee
*Director of the United States Patent and Trademark Office*